Nov. 15, 1955  L. V. FRANCE  2,723,402
PROPOLIS CULTURE

Original Filed July 12, 1950  5 Sheets-Sheet 1

INVENTOR.
Lloyd V. France,
BY
Benjamin Inman,
ATTORNEY

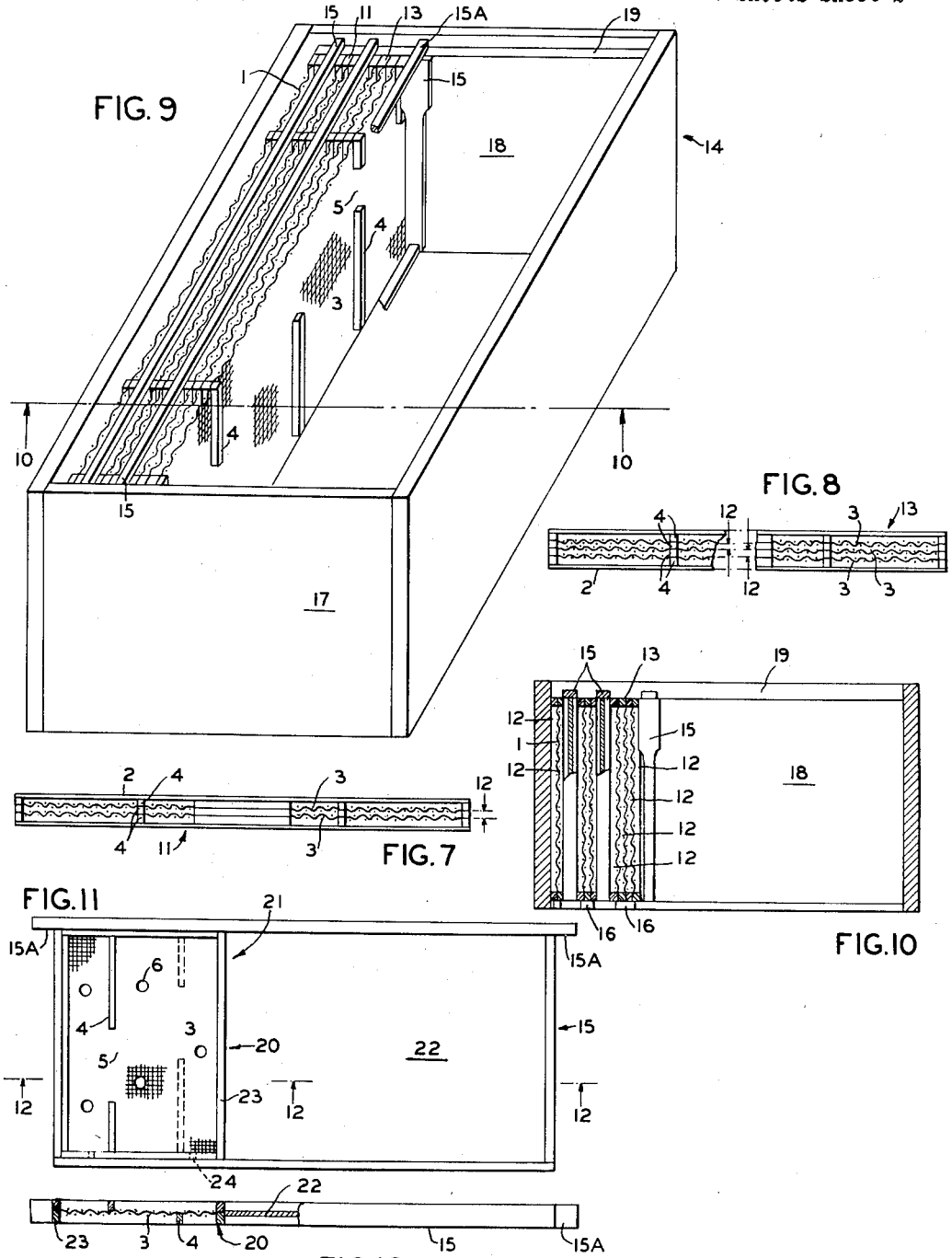

Nov. 15, 1955     L. V. FRANCE     2,723,402
PROPOLIS CULTURE

Original Filed July 12, 1950     5 Sheets-Sheet 3

INVENTOR.
Lloyd V. France,
BY
ATTORNEY

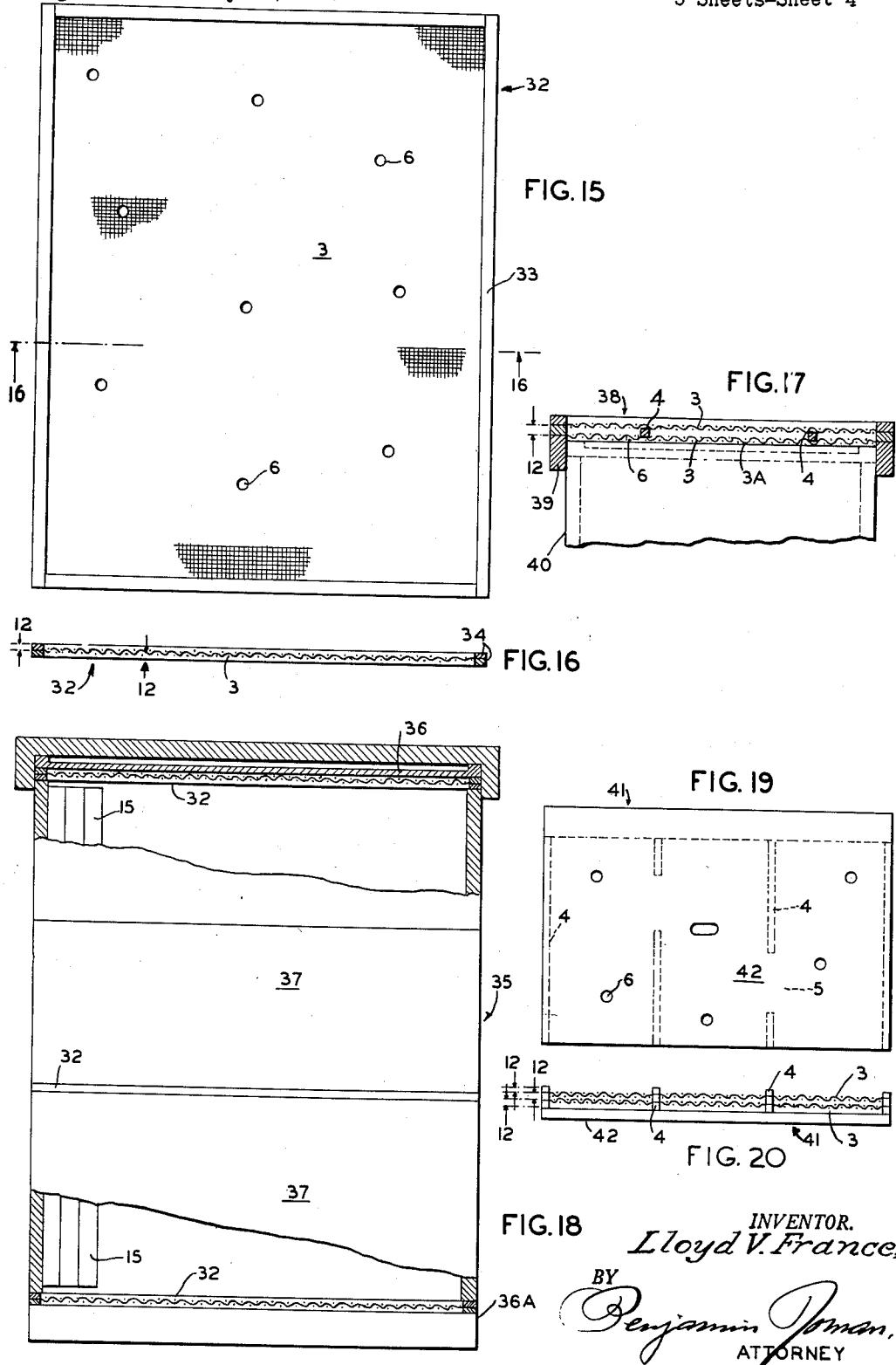

Nov. 15, 1955      L. V. FRANCE      2,723,402
PROPOLIS CULTURE

Original Filed July 12, 1950      5 Sheets-Sheet 5

*INVENTOR.*
LLOYD V. FRANCE

BY *Benjamin Yoman,*
ATTORNEY

United States Patent Office 2,723,402
Patented Nov. 15, 1955

2,723,402
PROPOLIS CULTURE
Lloyd V. France, Platteville, Wis.

Original application July 12, 1950, Serial No. 173,327, now Patent No. 2,681,458, dated June 22, 1954. Divided and this application March 25, 1954, Serial No. 418,710

5 Claims. (Cl. 6—2)

This invention relates to bee culture, and particularly to derivation of propolis from bee hives. Propolis, commonly known as bee glue, is a resinous material collected by bees from trees and plants, and is by them brought to the hive wherein they utilize it for sealing cracks and other purposes useful to their operations. As the bees bring this material in far greater quantities than needed for their useful purposes, it is found scattered all over the hive, wherein it produces cementation and damage to its severable parts, uncleanliness, misspent labor, and other annoyances to the bee keeper. Propolis is however highly useful for medicinal and many industrial purposes, and it would be much more valuable to society if it were obtainable in sufficiently large amounts, which is not possible nowadays owing to absence of means, devices, and facilities for its production, ingathering, and accumulation.

The principal object of the invention is to obtain propolis in large quantities through the operation of bee hives, the sale of which material will be in turn profitable to the apiarist.

Another object is to equip a bee hive with devices and appurtenances, which will induce the bees to deposit all their surplus propolis thereinto and accumulate it for collection by the apiarist, and will incidentally remedy all of the above mentioned disadvantages presently existing in hives.

A further object is to provide a bee hive with the aforesaid equipments, which will be conveniently and economically manufacturable, salable at low cost, and conveniently utilizable.

This is a divisional application of my presently pending application filed July 12, 1950, Serial No. 173,327, now Patent No. 2,681,458, issued June 22, 1954.

Other objects and advantages will hereinafter appear.

In the accompanying drawings—

Fig. 7 is a top plan view illustrating a device which is a modification of that shown in Figs. 1 to 4.

Fig. 8 is a top plan view similar to that in Fig. 7, but illustrating a device which is another modification of the invention shown in Figs. 1 to 4.

Fig. 9 is a perspective view illustrating a bee hive, with the hereinabove devices mounted in operative position therein.

Fig. 10 is a cross-sectional view taken on line 10—10 of Fig. 9.

Fig. 11 is an elevational view of a honeycomb frame having therein inserted a device which is a modification of the invention.

Fig. 12 is a cross-sectional bottom plan view of said modification, taken on line 12—12 of Fig. 11.

Fig. 15 is an elevational view showing a device which is a modification of the invention.

Fig. 16 is a cross-sectional elevational view, taken on line 16—16 of Fig. 15.

Fig. 17 is a cross-sectional elevational view illustrating a bee hive cover embodying the invention.

Fig. 18 is a front elevational view of a hive, partly in cross-section, and illustrating therein the positions of the devices shown in Figs. 15, 16.

Fig. 19 is a front elevational view of a device which is another modification of the invention, and adapted for installation exteriorly and in front of the entrance of a hive.

Fig. 20 is a top plan view of the device shown in Fig. 19.

Figure 1:
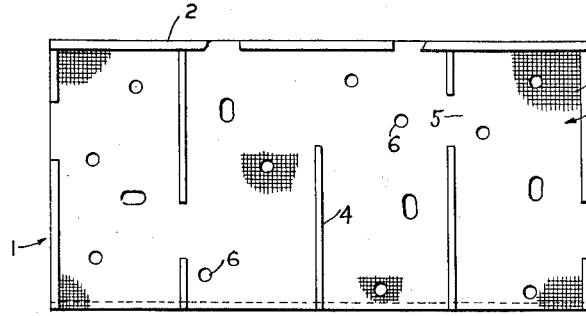
Fig. 1 is an elevational view showing a device utilized in connection with this invention.
Figure 4:
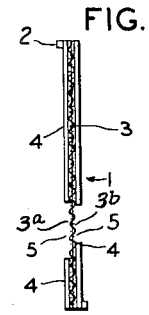
Fig. 4 is an end elevational view of the device as seen from the right in Fig. 1.
Figure 2:
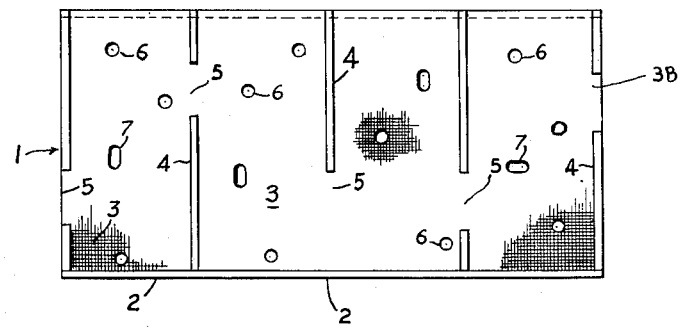
Fig. 2 is an elevational view of the device shown in Fig. 1, but illustrating it as it appears upon its opposite side.

The device 1, Figs. 1–4, comprises a frame 2 having a length and height approximating those of a usual honeycomb frame, in which frame 2 is mounted a metallic cloth screen 3 constituting a foraminous sheet. To each face 3A, 3B of the sheet 3 is secured as shown a plurality of moldings 4, constituting staggered partitions with gaps 5, and said sheet is provided with a plurality of openings 6, 7. The partitions 4 are made of a thickness which is no less nor greater than that of a bee space, and the openings 6, 7 are only sufficiently large to permit bee passage therethrough, the term "bee space" being more fully hereinafter described.

Figure 5:
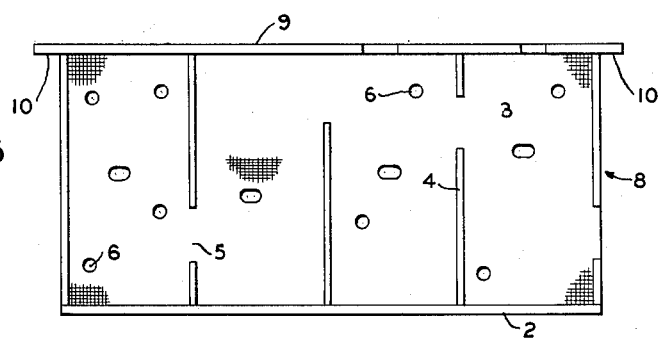
Fig. 5 is a view similar to Fig. 1, but showing a device which is a modification of the invention.
Figure 6:
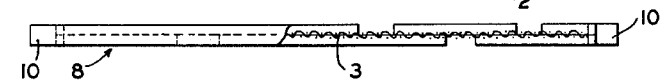
Fig. 6 is a bottom plan view of the device shown in Fig. 5, the top rail 9 thereof being shown broken off for convenience in illustration.

The device 8 shown in Figs. 5, 6 is similar to the device 1, Figs. 1–4, but is provided with a top rail 9 having overhanging portions 10, similar to hangers forming part of the well known type of honey comb frame hereinafter shown.

Figure 3:
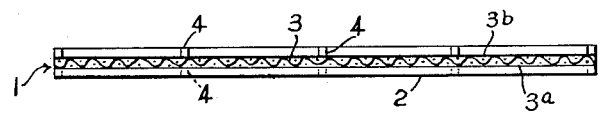
Fig. 3 is a top plan view of the device shown in Fig. 1.

The device 11 shown in Fig. 7 is a modification similar to the device 1, Fig. 3, but providing two foraminous sheets 3 each of which is similar to sheet 3 in Fig. 1 and separated from each other by a bee space 12. The device 13 is in turn similar to the device 11, but is provided with three sheets 3, Fig. 8, separated by bee spaces 12.

As shown in Fig. 9, the devices 1, 11, or 13 are positioned in operative state within the bee hive, by inserting one thereof between any two of the honey comb frames 15. The hive 14 may thus have placed thereinto either the devices 1, or the devices 11, 13, or several of one of these types and several of the others, as herein illustrated. If the devices are made as in Fig. 1 they may be supported by resting upon short projecting brackets 16 of front and rear walls 17, 18, respectively, of the hive, but if the devices 8, Fig. 5, are utilized they may be supported by merely resting their hangers 10 upon the rabbetted shoulders 19 of the hive, in manner of the hangers 15a of the comb frames 15, as shown.

In the modification shown in Figs. 11, 12, the device 20 is narrower than those in Fig. 9, and is mountable in the forward region 21 of the plane of comb 22 of frame 15, as illustrated. The device 20 includes a frame 23, with a screen 3, openings 6, and partition moldings 4, similar to those of device 1, and is provided with dowel holes 24, through which brads may be passed for removably securing the device in the honey comb frame 15.

Figure 13:
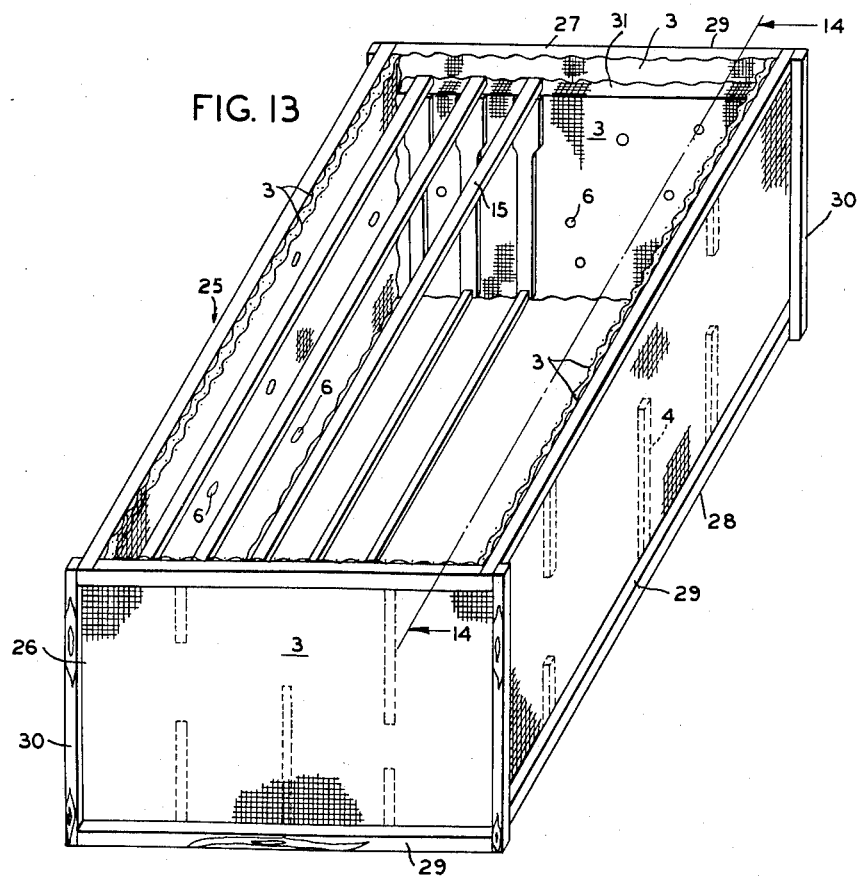
Fig. 13 is a perspective view illustrating a hive, the walls of which embody the invention.
Figure 14:
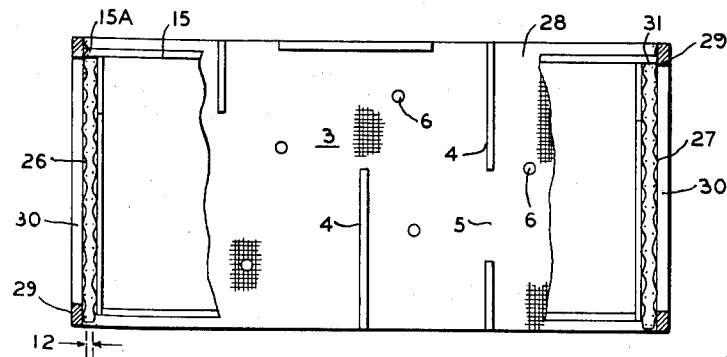
Fig. 14 is a transverse cross-sectional view of the hive, taken on line 14—14 of Fig. 13.

The hive 25, Figs. 13, 14, comprises a front wall 26, rear wall 27, and side walls 28, each of which walls consists of two screens 3 similar to those in devices 1, 11, and separated from each other by a bee space, the screens 3 and said walls being reinforced by rectangular frames 29 and uprights 30, as shown. The inner sheet 3 of each of said walls is provided with a plurality of openings 6, and between it and its adjacent exterior sheet 3 are located partial partitions 4, similarly to those in device 1, Fig. 1. The upper rim 31 of the inner sheet 3 of each wall 26, 27 is preferably bent rightangularly as shown, to provide a shoulder for thereon suspending usual comb frames 15, in manner similar to that shown in Fig. 9.

The device 32, Figs. 15, 16, comprises a sheet 3 with openings 6, similarly to device 1, Fig. 1, held in a frame 33 consisting of moldings 34 having the thickness of a bee space. As illustrated in Fig. 18, the device 32 is placeable in the hive 35 either against its inner cover 36, upon its bottom board 36a, or between the hive bodies 37, as shown.

The device 38, Fig. 17, constitutes a hive outer cover, comprising a pair of screens 3 separated by a bee space 12, with partial partitions 4 between the screens and the openings 6 in lower screen 3a, in manner of device 1, Fig. 1, and said screens are mounted in a frame 39 serving as the rim of the cover for the hive 40.

Figure 21:
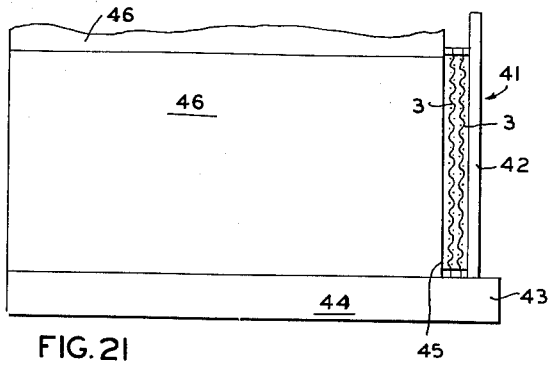
Fig. 21 is a side elevational view of the device shown in Fig. 19, and illustrating it as it appears when in operative position in relation to the hive entrance.

The device 21, Figs. 19, 20, 21, comprises a vertical board 42, a pair of screens 3 separated by bee spaces 12, said wall and screens each having openings 6 and partial partitions 4 like those in device 1, Fig. 1, and the device is mountable in operative position as shown in Fig. 21, upon the rails 43 of bottom board 44, frontwardly of bee entrance 45 of hives 46.

Figure 22:
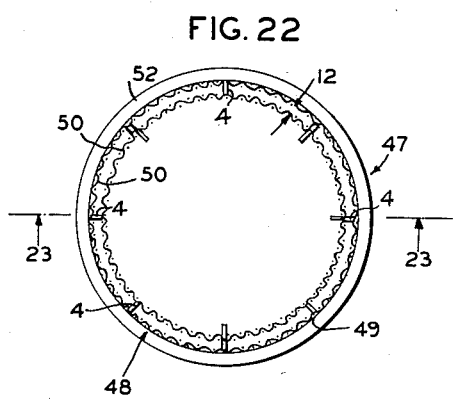
Fig. 22 is a top plan view of a modification of the invention which is in form of a hive super.
Figure 24:
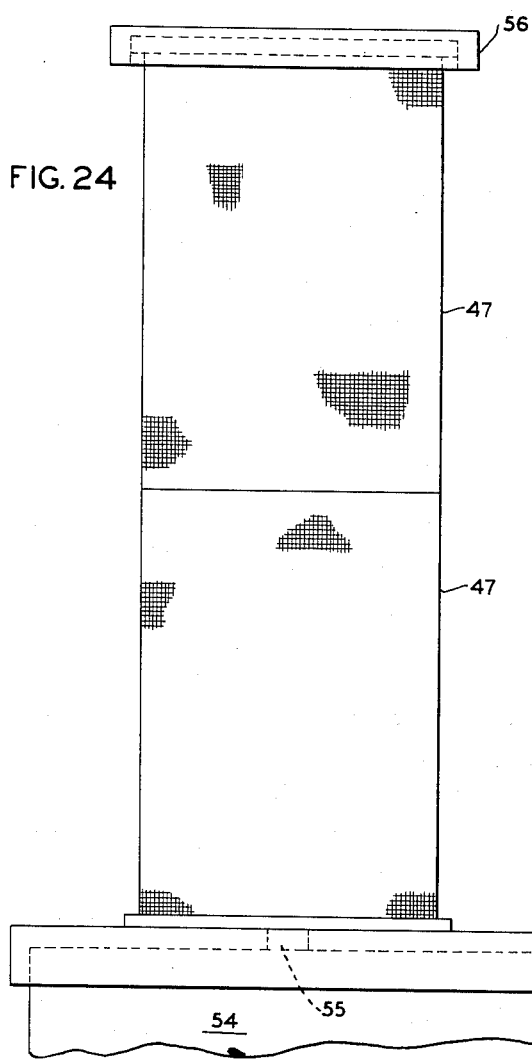
Fig. 24 is an elevational view illustrating the device in Figs. 22, 23, as it appears when installed over a usual hive.
Figure 23:
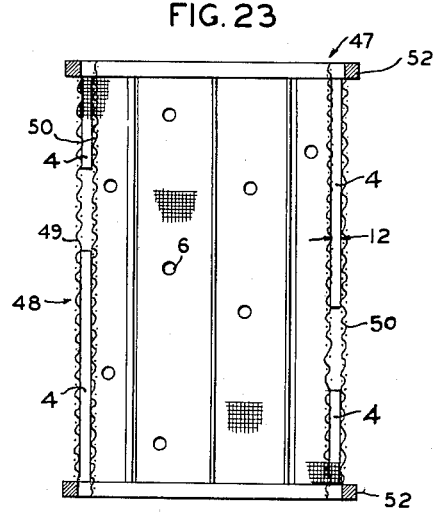
Fig. 23 is a cross-sectional elevational view of the device shown in Fig. 22, taken on line 23—23 in Fig. 22.

The device 47, in Figs. 22, 23, 24, includes a vertical cylindrical shell 48, the wall 49 of which consists of two annular screens 50 separated by partial partitions 4 to a distance of a bee space 12, and the outer screen is rimmed by hoops 52. The inner screen 50 is provided with a plurality of bee passage openings 6, in manner of device 1, Fig. 1. When in operative state, the device 47 or two thereof are placed upon the outer cover 53 of a hive 54 and over the usual opening 55 of the former, as illustrated in Fig. 24, and the top of the device 47 is capped by a circular cover 56.

The hereinabove term "bee space" or "bee passageway" means a space of from .160 inch to about one-half inch, through which the bees pass freely, and which are the mode of spacings required to be provided throughout the hive and between the various internal parts thereof. It will be noted in Figs. 9, 18, that the devices 1 or 8, 11 or 13, 20, 32 are in all cases positioned in operative state within the said bee spacings of the hive, and it will be also noted that the openings of the screen material itself constituting the foraminous sheets 3 are less than .160" or less than a bee space. It is found to be in the nature of the worker bees to continually inspect the entire hive on lookout for any crevices, cracks, or openings, and to thereupon fill and clog up the same with propolis for complete sealing, apparently to avoid drafts and preserve the temperature of the interior. Also, if they encounter any passageway space which is less than .160 inch in height or extent the worker bees will not attempt to enter it, but will proceed to fill up with propolis such spaces, apparently unusable to them, and it is these instincts of the bees which are resorted to in the concept, execution, and carrying out of this invention.

In operation, assuming that the hive is equipped with most or all of the above devices of the invention, the bees approaching the entrance 45, Fig. 21, will pass through the openings 6 of wall 42 and sheets 3, enter their bee spaces 12, and proceed to coat and clog the sheets of the device 41 in an effort to seal all the perforations of their screen material. Those bees and others will pass through entrance 45, and thereat encountering a device 42, Fig. 18, between the bottom board 36a and the combs 15 of hive 37, will similarly proceed to coat and clog the sheet 3 of this device throughout its opposite faces, by passage through its bee space openings 6. The bees passing upwardly may encounter a similar device 32, as shown, between adjacent hives 37, and so likewise coat and clog its foraminous sheet 3. The bees may then enter another hive, as 17 in Fig. 9, and therein encountering devices 1 or 11, or 13 will pass through their openings 6 and into their bee spaces 12 and will therefore clog and coat with propolis both faces and all perforations of each of their sheets 3. It will be noted that owing to the scattered distribution of the openings 6, partial partitions 4, and gaps 5 of these sheets 3, the bees will be induced to scatter and spread throughout each face of the sheets, under compulsion of the staggering of said openings, partitions, and gaps, and so will tend to coat all sheets 3 with propolis therethroughout.

If the combs 15 in any of the hives shown should be equipped with devices 20, Figs. 11, 12, the bees will encounter the same and proceed to similarly coat and clog with propolis the sheets 3 of these devices. The bees may furthermore encounter a device 32 adjacent the inner cover 36 of a hive, as in Fig. 18, and passing through the opening 6 of its sheet 3 will proceed to coat with propolis both faces of the sheet therethroughout.

Should a hive 54 and its outer cover 53 be topped by one or more devices 48, as in Fig. 24, the bees will pass through the usual cover opening 55 into the cylinder 48 and passing through its openings 6 will enter its bee space 12 and coat with propolis the faces and perforations of both its annular screens 50. Incidentally, the device 48 is usable as a honey storage super, without any comb frames, for producing strained honey and wax, coincidentally with the production of its said propolis.

In a similar manner, the device 38 in Fig. 17 will have its sheets 3 coated and clogged with propolis by the bees, where the device is used as an outer cover for a hive 40.

Where a hive body device 25 is utilized, in place of a usual wooden hive body 17, Fig. 9, as provided in Figs. 13, 14, the bees will pass through the openings 6 of its inner screens 3 and enter the bee spaces 12 of its walls 26, 27, 28, and will then proceed to coat and clog the sheets 3 thereof over their entire faces, in the manner described hereinabove in connection with all the other devices, in all of which as well as in the device 25 the bees continue to deposit the propolis over the sheets 3 until all their mesh openings or perforations are ultimately sealed up.

In due course, all of the devices 1 or 8, 11, 13, the devices 20, 25, 32, 38, and 41, 48 become fully filled and clogged with accumulations of propolis, whereupon they may be removed from the hive, the propolis completely cleared therefrom, and the cleaned devices may be thereafter reassembled into the hive for repetition of their functions.

The removal and clearing of the accumulated propolis from all of the aforesaid devices may be performed by various suitable methods and means that are well known for purposes of removal of resinous materials in dry state from surfaces, as by application of heat or solvents to the screens 3 of the devices.

Variations may be resorted to within the scope of the invention, and portions of the improvements may be used without others.

Having thus described my invention, I claim:

1. A bee hive body for propolis obtention including a wall comprising an exterior foraminous sheet and an interior foraminous sheet, said sheets being separated from each other by a distance of a bee space, and said interior sheet having openings to permit bee passage therethrough and into said space, for inducing the bees to coat and clog said sheets with propolis.

2. A bee hive body for propolis obtention including a wall comprising an exterior foraminous sheet and an interior foraminous sheet, said sheets being separated from each other by a distance of a bee space, said interior sheet having openings to permit bee passage therethrough and into said space, for inducing the bees to coat and clog said sheets with propolis, and said wall having within said space a plurality of partial partitions to induce the bees to traverse over maximum areas of said sheets within said space.

3. A bee hive body for propolis obtention consisting of an annular wall comprising an exterior foraminous sheet and an interior foraminous sheet, said sheets being separated from each other by a distance of a bee space, and said interior sheet having openings to permit bee passage therethrough and into said space, for inducing the bees to coat and clog said sheets with propolis.

4. A bee hive body for propolis obtention consisting of an annular wall comprising an exterior foraminous sheet and an interior foraminous sheet, said sheets being separated from each other by a distance of a bee space, said interior sheet having openings to permit bee passage therethrough and into said space, for inducing the bees to coat and clog said sheets with propolis, and said wall having within said space a plurality of partial partitions to induce the bees to traverse over maximum areas of said sheets within said space.

5. A bee hive body as defined in claim 1, said wall being a vertical wall, and the interior sheet having its upper rim turned at right angles toward the exterior sheet to define a supporting shoulder.

References Cited in the file of this patent

UNITED STATES PATENTS

| | | |
|---|---|---|
| 519,652 | Taylor | May 8, 1894 |
| 838,444 | Padgett | Dec. 11, 1906 |
| 2,517,419 | France | Aug. 1, 1950 |